United States Patent
Ma et al.

(10) Patent No.: US 10,277,293 B1
(45) Date of Patent: Apr. 30, 2019

(54) MULTI-USER-MIMO DETECTION USING SPACE-TIME EQUALIZATION

(71) Applicant: Cisco Technology, Inc., San Jose, CA (US)

(72) Inventors: Xiaoli Ma, Norcross, GA (US); Hongyi Fu, Marietta (GA); Brian D. Hart, Sunnyvale, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/819,254

(22) Filed: Nov. 21, 2017

(51) Int. Cl.
*H04B 7/0452* (2017.01)
*H04L 25/02* (2006.01)
*H04L 27/26* (2006.01)

(52) U.S. Cl.
CPC ......... *H04B 7/0452* (2013.01); *H04L 25/022* (2013.01); *H04L 25/0242* (2013.01); *H04L 27/266* (2013.01); *H04L 27/2665* (2013.01); *H04L 27/2678* (2013.01)

(58) Field of Classification Search
CPC .............. H04B 7/0452; H04L 25/0242; H04L 27/2665; H04L 27/2678; H04L 25/022; H04L 27/266
See application file for complete search history.

(56) References Cited

U.S. PATENT DOCUMENTS

| | | | |
|---|---|---|---|
| 7,725,091 B2 * | 5/2010 | Legouable | H04L 1/0625 375/299 |
| 8,676,144 B2 | 3/2014 | Guo et al. | |
| 9,584,278 B2 | 2/2017 | Hart et al. | |
| 2007/0054692 A1 * | 3/2007 | Nie | H04L 25/03159 455/522 |
| 2009/0316840 A1 * | 12/2009 | Park | H04L 1/0631 375/341 |
| 2011/0026639 A1 * | 2/2011 | Rouquette-Leveil | H04B 7/0671 375/298 |

(Continued)

OTHER PUBLICATIONS

S. Chen, et al., "Minimum Bit-Error Rate Design for Space-Time Equalization-Based Multiuser Detection", IEEE Transactions on Communications, vol. 54, No. 5, May 2006, 9 pages.

(Continued)

*Primary Examiner* — Dady Chery
(74) *Attorney, Agent, or Firm* — Edell, Shapiro & Finnan, LLC (57) ABSTRACT

A wireless device, such as an wireless access point, receives signals detected by a plurality of antennas of a wireless device to produce a plurality of antenna-specific receive signals potentially representing a wireless transmission received from each of one or a plurality of devices. A signal processing component of the wireless device, such as a modem, performs several operations on the antenna-specific receive signals, including building a first space-time equalizer to be applied to the plurality of antenna-specific receive signals to recover a transmission from a first device by both equalizing channel effects and canceling out effects associated with transmissions from devices other than the first device, and building a second space-time equalizer to be applied to the plurality of antenna-specific receive signals to recover a transmission from a second device by both equalizing channel effects and canceling out effects associated with transmissions from devices other than the second device.

20 Claims, 5 Drawing Sheets

(56) References Cited

U.S. PATENT DOCUMENTS

| | | | |
|---|---|---|---|
| 2013/0287131 A1* | 10/2013 | Hart | H04B 7/0456 375/267 |
| 2014/0241240 A1 | 8/2014 | Kloper et al. | |
| 2015/0063190 A1 | 3/2015 | Merlin et al. | |
| 2015/0327121 A1 | 11/2015 | Li et al. | |
| 2017/0012752 A1 | 1/2017 | Hart et al. | |
| 2017/0207817 A1* | 7/2017 | Hadani | H04L 5/0016 |

OTHER PUBLICATIONS

T. Thomas, et al., "Asynchronous Interference Suppression in Broad-band Cyclic-Prefix Communications", WCNC IEEE Wireless Communications and Networking, New Orleans, LA, Mar. 16-20, 2003, 5 pages.

H. Cheon, et al., "A Blind Spatio-Temporal Equalizer Using Cyclic Prefix in OFDM Systems", ICASSP '00, Proceedings 2000 IEEE International Conference on Acoustics, Speech, and Signal Processing, Istanbul, Turkey, Jun. 5-9, 2000, 4 pages.

Bejarano et al., "Scaling Multi-User MIMO WLANs: The Case for Concurrent Uplink Control Messages", IEEE International Conference on Sensing, Communication, and Networking, Jun. 22-25, 2015, 9 pages.

Favalli et al., "Frequency Domain Estimation and Compensation of Intercarrier Interference in OFDM Systems", Spread Spectrum Techniques and Applications, ISSSTA '08. IEEE 10th International Symposium on, Sep. 2008 pp. 470-474, 5 pages.

\* cited by examiner

MULTI-USER-MIMO DETECTION USING SPACE-TIME EQUALIZATION

TECHNICAL FIELD

The present disclosure relates to wireless communication systems.

BACKGROUND

In a Wi-Fi® wireless networking environment, it is possible that multiple users simultaneously transmit to an access point using multiple spatial streams. The challenge is how to detect different asynchronous users, perform synchronization and channel estimation of their independent signals, and then accurately decode the symbols for each user.

The IEEE 802.11ac specification defines downlink Multi-User Multiple Input Multiple Output (MU-MIMO) but not uplink MU-MIMO (UL-MU-MIMO). UL-MU-MIMO is a way to "add capacity" by using the spatial resources at a wireless access point to receive multiple parallel transmissions from client devices.

DESCRIPTION OF EXAMPLE EMBODIMENTS

Overview

In accordance with an embodiment, a method is provided for multi-user MIMO detection. A wireless device, such as an wireless access point, receives signals detected by a plurality of antennas of a wireless device to produce a plurality of antenna-specific receive signals potentially representing a wireless transmission received from each of one or a plurality of devices. A signal processing component of the wireless device, such as a modem, detects from the plurality of antenna-specific receive signals a transmission from a first device. The signal processing component performs a synchronization and a cyclic prefix removal operation from the plurality of antenna-specific receive signals to produce a time domain first device signal. The signal processing component converts the time domain first device signal to a frequency domain first device signal, and computes an estimated channel response matrix for the first device based on the frequency domain first device signal. The signal processing component computes a null space matrix based on the estimated channel response matrix for the first device. Using the null space matrix, the signal processing component cancels from the frequency domain first device signal any contribution associated with a transmission received at the plurality of antennas from the first device to produce a second frequency domain signal. The signal processing component converts the second frequency domain signal to the time domain to produce a second time domain signal, and detects from the second time domain signal a transmission from a second device. The signal processing component configures/builds a first space-time equalizer to be applied to the plurality of antenna-specific receive signals to recover the transmission from the first device by both equalizing channel effects and canceling out effects associated with transmissions from devices other than the first device in the plurality of antenna-specific receive signals. Similarly, the signal processing component, based on the second time domain signal, configures/builds a second space-time equalizer to be applied to the plurality of antenna-specific receive signals to recover the transmission from the second device by both equalizing channel effects and canceling out effects associated with transmissions from devices other than the second device in the plurality of antenna-specific receive signals.

Example Embodiments

Multi-user detection for asynchronous wireless devices transmitting (on uplinks) to a single device is a challenging problem. Presented herein is a system and techniques for detecting different wireless devices (users) on-line, perform synchronization and channel estimation, and then decode the symbols for each user.

Figure 1:
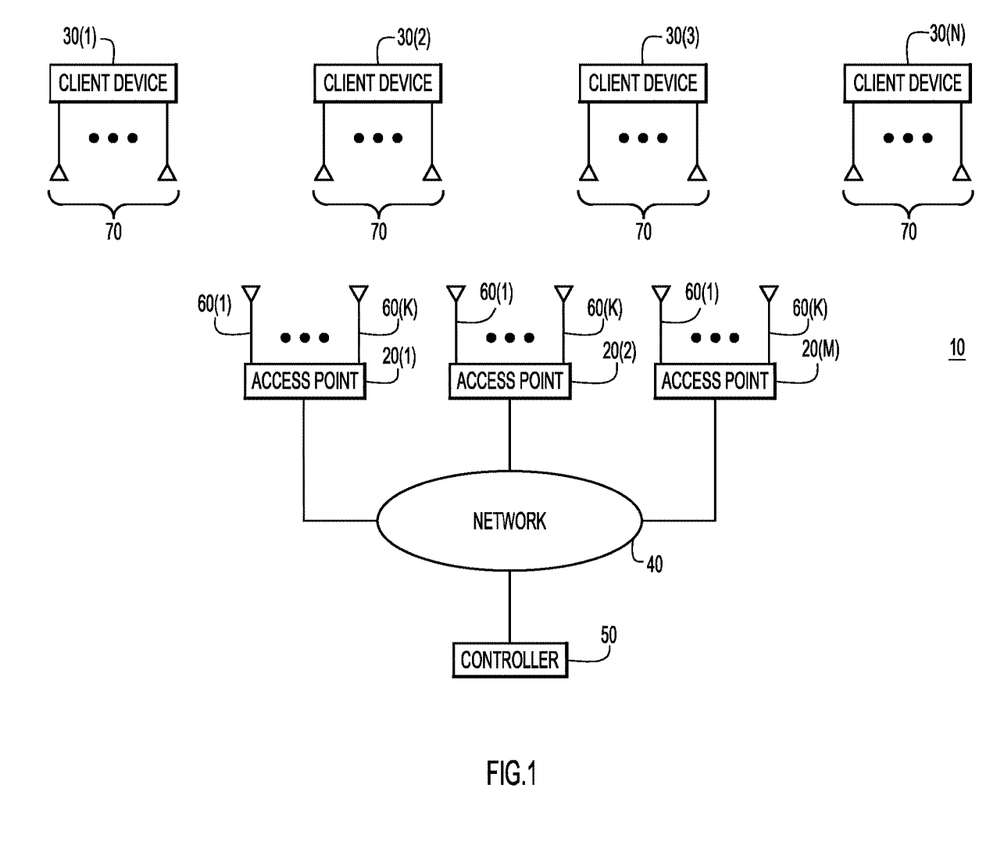
FIG. 1 is diagram of a wireless network system in which multi-user MIMO detection using space-time equalization may be employed, according to an example embodiment.

Referring first to FIG. 1, a diagram is shown of a wireless communication system or network 10 that includes a plurality of wireless access points 20(1)-20(M) and a plurality of wireless client devices 30(1)-30(N). The wireless access points 20(1)-20(M) are connected to a network (e.g., a local area network) 40. There is also a controller 50 that is connected to the network 40 and is provided to perform control over the access points 20(1)-20(M) as well as other functions. Each of the wireless access points 20(1)-20(M) has a plurality of antennas 60(1)-60(K), and each client device 30(1)-30(N) has one or more antennas 70. The client devices 30(1)-30(N) are also referred to as "clients" or "users".

DL-MU-MIMO techniques can be used for an access point, such as access point 20(1), to simultaneously transmit multiple data frames intended to different client devices (e.g., client devices 30(1), 30(2) and 30(3)), by exploiting spatial multiplexing that can be achieved through appropriate weights applied to the subcarriers that carry encoded data frames before transmitted from the plurality of antennas of the access point. The access point needs to have reliable channel state information (CSI) for each of the client devices, but this may have been obtained from prior transmissions with the client devices.

The clients 30(1)-30(2) may asynchronously send uplink transmissions to a given access point, e.g., access point 20(1). The techniques presented herein relate to detecting the transmission from the different clients, performing synchronization and channel estimation, and then decoding the symbols included in the transmissions for each client.

Figure 2:
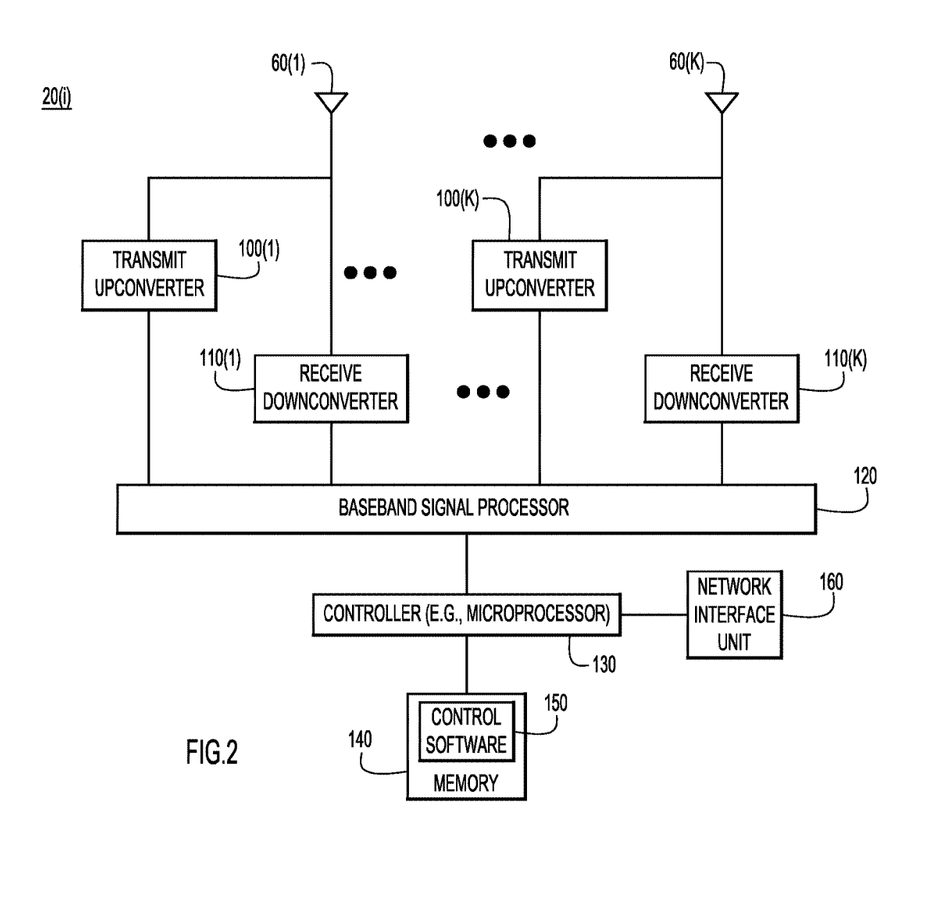
FIG. 2 is a block diagram of a wireless access point configured to perform multi-user MIMO detection using space-time equalization, according to an example embodiment.

Reference is now made to FIG. 2 which illustrates a block diagram of a wireless access point 20(i) representative of any of the access points shown in FIG. 1 configured to perform the operations described below. The access point includes the plurality of antennas 60(1)-60(K), a plurality of transmit upconverters 100(1)-100(K) each connected to a corresponding one of the antennas 60(1)-60(K) and a plurality of receive downconverters 110(1)-110(K) each connected to a corresponding one of the antennas 60(1)-60(K). A baseband signal processor 420 (e.g., modem) is provided that is connected to the plurality of transmit upconverters 100(1)-100(K) and the plurality of receive downconverters 110(1)-110(K). The baseband signal processor 120 performs the baseband transmit signal processing of signals to be transmitted via the plurality of antennas 60(1)-60(K), e.g., for DL-MU-MIMO and single user transmissions, and performs the baseband receive processing of signals that are received by the plurality of antennas 60(1)-60(K). The baseband signal processor 120 may take the form of one or more integrated circuits including fixed or programmable digital logic gates to perform various functions such as analog-to-digital conversion, digital-to-analog conversion, Fast Fourier Transform, etc.

The access point 20(i) further includes a controller 130 that may take the form of one or more microprocessors or microcontrollers. A memory 140 is provided that stores instructions for control software 150. There also is a network interface unit 160 that enables wired network connectivity for the access point 20(i).

The memory 140 may include read only memory (ROM), random access memory (RAM), magnetic disk storage media devices, optical storage media devices, flash memory devices, electrical, optical, or other physical/tangible memory storage devices. Thus, in general, the memory 140 may include one or more tangible (non-transitory) computer readable storage media (e.g., a memory device) encoded with software comprising computer executable instructions and when the software is executed (by the controller 130) it is operable to perform the operations described herein.

The signal processing described below for multi-user detection and space time equalization may be performed by the baseband signal processor 120 alone using digital signal processing techniques, the controller 130 alone, or partly by the baseband signal processor 120 and party by the controller 130. In one form, the baseband signal processor 120 is implemented in one or more application specific integrated circuits (ASICs)

Figure 3:
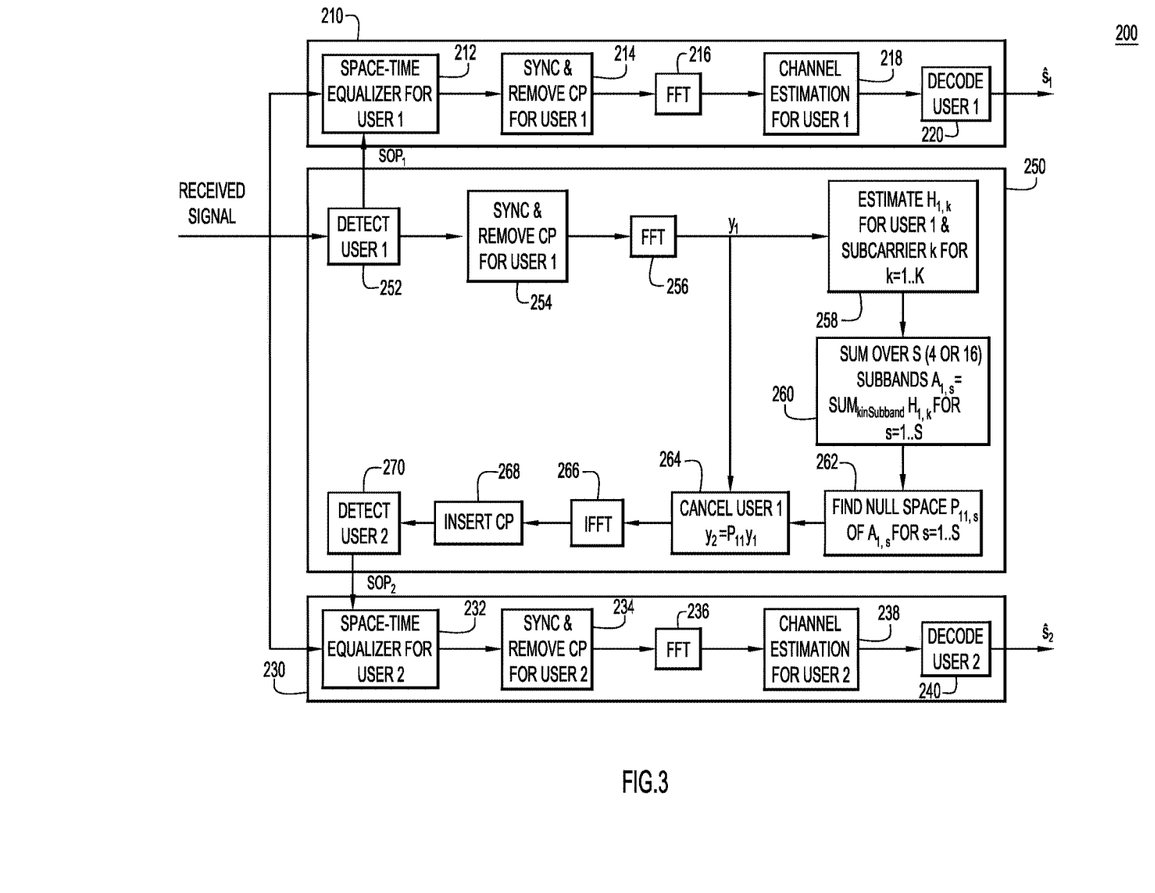
FIG. 3 is a more detailed functional block diagram of the multi-user MIMO detection using space-time equalization operations, according to an example embodiment.

Reference is now made to FIG. 3. FIG. 3 illustrates a functional block diagram of the operations of a combined multi-user detection and space-time equalization process, shown generally at 200. The process 200 is performed, for example, by the baseband signal processor 120 alone, or in combination with operations performed by the controller 130, as shown in FIG. 2. The combined multi-user detection can process asynchronous users with low latency and relatively low complexity. The multiple receive antennas of the access point are used for user detection and to build/configure space-time equalization (STE) filters that assist with user detection.

Typically the frames from different clients do not arrive at the same time at the access point, and there is no way for the access point to know when a client may transmit. Thus, the client (user) transmissions are said to be asynchronous.

FIG. 3 is specific to a scenario of colliding frames from two clients/users, but one with ordinary skill in the art would understand how this can be generalized to colliding frames from N clients, where N>2.

The input to the process 200 is a received signal. This received signal may, at any given point in time, include samples derived from energy received from one or more users and any interference/noise. The diagram of FIG. 3 is organized, for illustration and description purposes, into a signal processing path 210 that is dedicated to producing decoded data for a transmission received from a first client/user, denoted User 1, and a signal processing path 230 that is dedicated to producing decoded data for a transmission received from a second client/user, denoted User 2. Signal processing paths 210 and 230 include similar operations and both operate on the receive signal as input.

Specifically, signal processing path 210 includes a STE for User 1 shown at 212, a synchronization (sync) and cyclic prefix (CP) removal for User 1 operation at 214, a Fast Fourier Transform (FFT) 216, a channel estimation for User 1 operation at 218 and a decoding of User 1 data operation at 220. Similarly, the signal process path 230 includes a STE for User 2 shown at 232, a synchronization and CP removal for User 2 operation at 234, an FFT 236, a channel estimation for User 2 operation at 238 and a decoding of User 2 data operation at 240.

In addition to signal processing paths 210 and 230, there is an additional signal processing path 250 that also receives as input the received signal. Signal processing path 250 includes a detect User 1 operation 252, a synchronization and CP removal for User 1 operation 254, an FFT 256, a channel response estimation operation 258, a summing operation 260, a null space estimation operation 262, a User 1 cancellation operation 264, an Inverse FFT (IFFT) 266, a CP insert operation 268 and a detect User 2 operation 270.

In operation, when a signal is received (thereby producing a plurality of antenna-specific receive signals at the plurality of antennas of the access point), the operation detect User 1 at 252 detects User 1 by calculating an auto-correlation on a Wi-Fi Legacy Short Training Field (L-STF) and cross-correlation for the Legacy Long Training Field (L-LTF). The legacy short training field (L-STF) is the first field of the 802.11 OFDM PLCP legacy preamble. The L-STF is a component of Very High Throughput (VHT), High Throughput (HT), and non-HT PPDUs. Because the L-STF has good correlation properties, it is used for start-of-packet (SOP) detection, coarse frequency correction, and setting gain control. The sequence uses 12 of the 52 subcarriers that are available per 20 MHz channel bandwidth segment. For 5 MHz, 10 MHz, and 20 MHz bandwidths, the number of channel bandwidths segments is 1.

The L-LTF is the second field in the 802.11 OFDM PLCP legacy preamble. The L-LTF is a component of VHT, HT, and non-HT PPDUs. Channel estimation, fine frequency offset estimation, and fine symbol timing offset estimation rely on the L-LTF. If energy from User 1 is detected at 252, then a signal and estimate of $SOP_1$ is asserted to the STE for User 1 operation 212.

Figure 4:
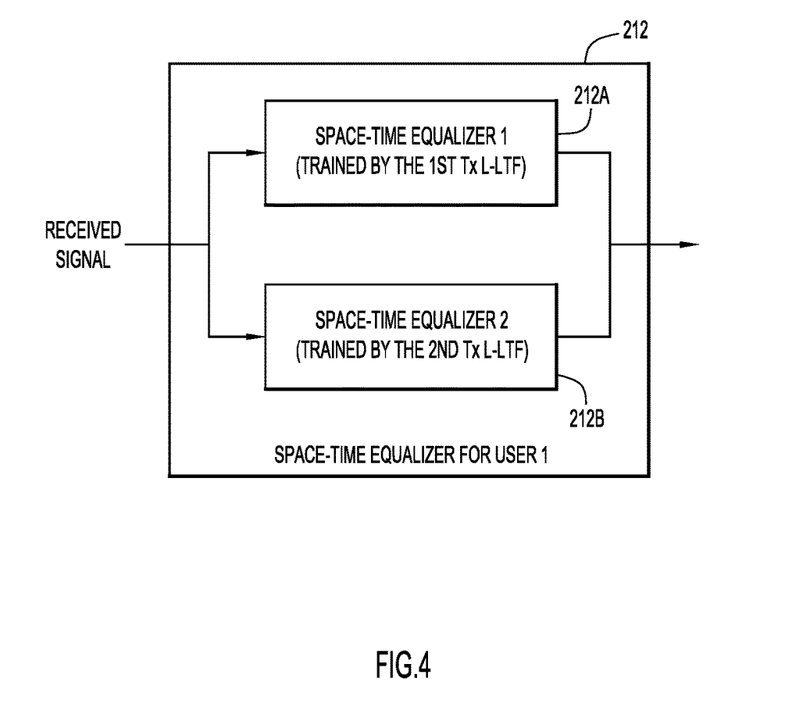
FIG. 4 is a functional diagram of a space-time equalizer, according to an example embodiment.

As shown in FIG. 4, the STE for User 1 operation may include two STE equalizer operation 212A and 212B in parallel. There are two STE equalizers for User 1 is because User 1 has two transmit spatial streams. There are two identical L-LTFs in a Wi-Fi frame, and this aspect is exploited. More specifically, the L-LTF is composed of a cyclic prefix (CP) followed by two identical long training symbols (C1 and C2). The CP consists of the second half of the long training symbol. The first and second long training blocks, L-LTFs, may be used to train the STE coefficients, to cancel out the effects of the energy from User 2, if any. For example, LTFs are used to estimate the channel. From the channel estimate, one can determine the nullspace, P, of the channel where any signal sent over that channel X, the nullspace would be nulled. When trying to receive a signal from client 2 and null client 1, the input signal can be multiplied by P. For User 1, the output of two space-time equalizers are combined in parallel, which can be regarded as the received signal from two receive antennas. The null space P estimation and nulling operation is done at signal processing path 250.

Referring back to FIG. 3, the sync and CP removal operation 214, which may include carrier frequency offset (CFO) and timing offset correction, is performed, followed by an FFT operation 216. At 218, the channel for User 1 is estimated and at 220, User 1's symbols are decoded.

In the signal processing path 250, after detecting energy for User 1 at 252, a sync and CP removal for User 1 operation is performed at 254, followed by an FFT operation 256 to generate $y_1$. Given $y_1$, at 258, the channel response for User 1 is estimated, $H_{1,k}$, for the kth subcarrier, for k=1 to K. At 260, the channel response across all subcarriers within sub-band channel $A_{1,s}$, s=1 to S, is summed.

At 262, the null space $P_{11,s}$ is computed using the channel response matrix for User 1, across sub-bands s=1 to S. The null space $P_{11,s}$ has a size ($N_{RX} \times (N_{RX}-2)$), where $N_{RX}$ is the number of antennas of the access point. There is a "2" in this size because it is assumed that User 1 has two transmit spatial streams. The null space $P_{11,s}$ may be computed using singular value decomposition (SVD) or other methods for each sub-band channel $A_{1,s}$ ($N_{RX} \times 2$).

At 264, the null space $P_{11,s}$ is used to cancel energy for User 1 from $y_1$ by multiplying $y_1$ by $P_{11,s}$ to generate $y_2$. At 266, an IFFT is computed (to produce a time-domain signal) and at 268, the CP is inserted to time-domain signal $y_2$.

At 270, energy and estimate of SOP for User 2 is detected by calculating a cross-correlation, using a long training (L-LTF) symbol, on the time-domain signal after energy for User 1 has been canceled. If energy for User 2 is detected, the signal $SOP_2$ is asserted. After detecting energy and SOP from User 2 at 270, the STE for User 2 can be configured for operation on the received signal. At 234, sync and CP removal for User 2 is performed (including CFO and timing offset correction). An FFT operation is performed at 236, and the channel for User 2 is estimated at 238. Finally, at 240, symbols for User 2 are decoded.

When operation 252 detects energy for User 1, the $SOP_1$ signal is asserted to indicate that what appears to be energy and starting of frame (SOP) for User 1 has been detected, but STE operation 212 is performed in case energy from another user, e.g., User 2, is also detected. Similarly, when operation 270 detects energy for User 2, the $SOP_2$ signal is asserted to indicate that what appears to be energy for User 2 has been detected, but STE operation 232 is performed in case energy from another user, e.g., User 1 is also detected. It should be understood that the arrow labeled $SOP_2$ and the Channel Estimate for User 2 should also go into the STE for User 1 block 212 and similarly for the arrow labeled $SOP_1$ and the Channel Estimate for User 1 into the STE for User 2 block 232. However, for simplicity, this is not shown in the figure. Moreover, the channel estimate applied to decoding User 1 would be updated with the appropriate null space matrix from that of User 2.

As shown in FIG. 3, a STE is used for both users, at 212 and 232. The main steps of the STEs are to (i) use the CP portion constructing $Y_1(b)$ and the last $N_{CP}$ samples to $Y_2(b)$ to calculate a mean squared error (MSE) with B OFDM symbols; (ii) use the training blocks to construct $Y_3$; (iii) apply Minimum Mean Squared Error (MMSE) rules for the STE coefficients. The purpose of the STEs is to cancel out the other user's effect and at the same time equalize the channel effects. Using the received signal y and the training signal x, the STE coefficients are configured using an MMSE criterion as follows:

$$g = (\gamma Y + Y_3^H Y_3)^{-1} Y_3^H x(b_T) \quad (1)$$

where the STE coefficient vector g is an $N_{RX} L_g \times 1$ vector, where $g = [g^T(0), g^T(1), \ldots, g^T(L_g-1)]^T$, each ($N_{RX} \times 1$), $g(l) = [g(l, 1), \ldots, g(l, N_{RX})]^T$, $N_{RX}$ is the number of receive antennas, and $L_g$ is the length of equalizer and $\gamma$ is a weighting factor for blind equalization.

In equation (1), Y is an $N_{RX} L_g \times N_{RX} L_g$ mean squared error (MSE) matrix between cyclic prefix (CP) portion and the last $N_{cp}$ samples of each OFDM symbol block, as:

$$Y = \sum_{b=1}^{B} (Y_1(b) - Y_2(b))^H (Y_1(b) - Y_2(b)) \quad (2)$$

where B is the number of OFDM symbol blocks used for blind equalization.

In equation (2), $Y_1(b)$ contains the received samples from the CP part of each OFDM symbol from all $N_{RX}$ antennas as:

$$Y_1(b) = \begin{bmatrix} y^T(N_{cp}-1+D, b) & \ldots & y^T(N_{cp}-L_g+D, b) \\ y^T(N_{cp}-2+D, b) & \ldots & y^T(N_{cp}-L_g-1+D, b) \\ \vdots & \ddots & \vdots \\ y^T(D, b) & \ldots & y^T(-L_g+1+D, b) \end{bmatrix},$$

and $Y_2(b)$ contains the received samples from the last $N_{CP}$ samples as $$Y_2(b) = \begin{bmatrix} y^T(N+N_{cp}-1+D, b) & \ldots & y^T(N+N_{cp}-L_g+D, b) \\ y^T(N+N_{cp}-2+D, b) & \ldots & y^T(N+N_{cp}-L_g-1+D, b) \\ \vdots & \ddots & \vdots \\ y^T(N+D, b) & \ldots & y^T(N-L_g+1+D, b) \end{bmatrix},$$

where N is the DFT (FFT) size,
$N_{CP}$ is the CP length,
D is the equalizer delay, and
$y(n, b) = [y_1(n, b), y_2(n, b), y_{N_{RX}}(n, b)]^T$ is the nth sample over all receive antennas of OFDM block b, $0 \le n \le N + N_{CP} - 1$.

In equation (1), $Y_3$ is an $(N+N_{CP}) \times N_{RX} L_g$ received sample matrix for training symbol block as $$Y_3 = \begin{bmatrix} y^T(N+N_{cp}-1+D, b_T) & \ldots & y^T(N+N_{cp}-L_g+D, b_T) \\ y^T(N+N_{cp}-2+D, b_T) & \ldots & y^T(N+N_{cp}-L_g-1+D, b_T) \\ \vdots & \ddots & \vdots \\ y^T(D, b_T) & \ldots & y^T(-L_g+1+D, b_T) \end{bmatrix},$$

where $b_T$ is the training OFDM symbol index, and $x(b_T)$ is an $(N+N_{CPp}) \times 1$ the $b_T$th training OFDM symbol block for each transmit antenna, $x = [x(N+N_{CP}-1, b_T), \ldots, x(0, b_T)]^T$.

The output of each STE 212 and 232 is the linear convolution of the received signal y and the space-time equalizer g:

$$\tilde{z} = y * g$$
$$z = \tilde{z}(0 : N_{RX} : N_{RX} \times (N + N_{CP}) \times N_{SYM})$$

where y is the $(N_{RX} \times (N+N_{CP}) \times N_{SYM}) \times 1$ received signal vector stacked with received samples over all receive antennas $y = [y(0,1)^T y(1,1)^T \ldots y(N+N_{cp} \ 1,1)^T \ldots$ y(0, $N_{SYM})^T \ldots$ y(1, $N_{SYM})^T \ldots$ y(N+$N_{CP}$−1, $N_{SYM})^T]^T$, $N_{SYM}$ is the total number of OFDM symbols received, and z is the output of the space-time equalizer, compared with \tilde{z}, vector z just down-samling $N_{RX} \times (N+N_{CP}) \times N_{SYM}$ samples by a factor of $N_{RX}$.

Figure 5:
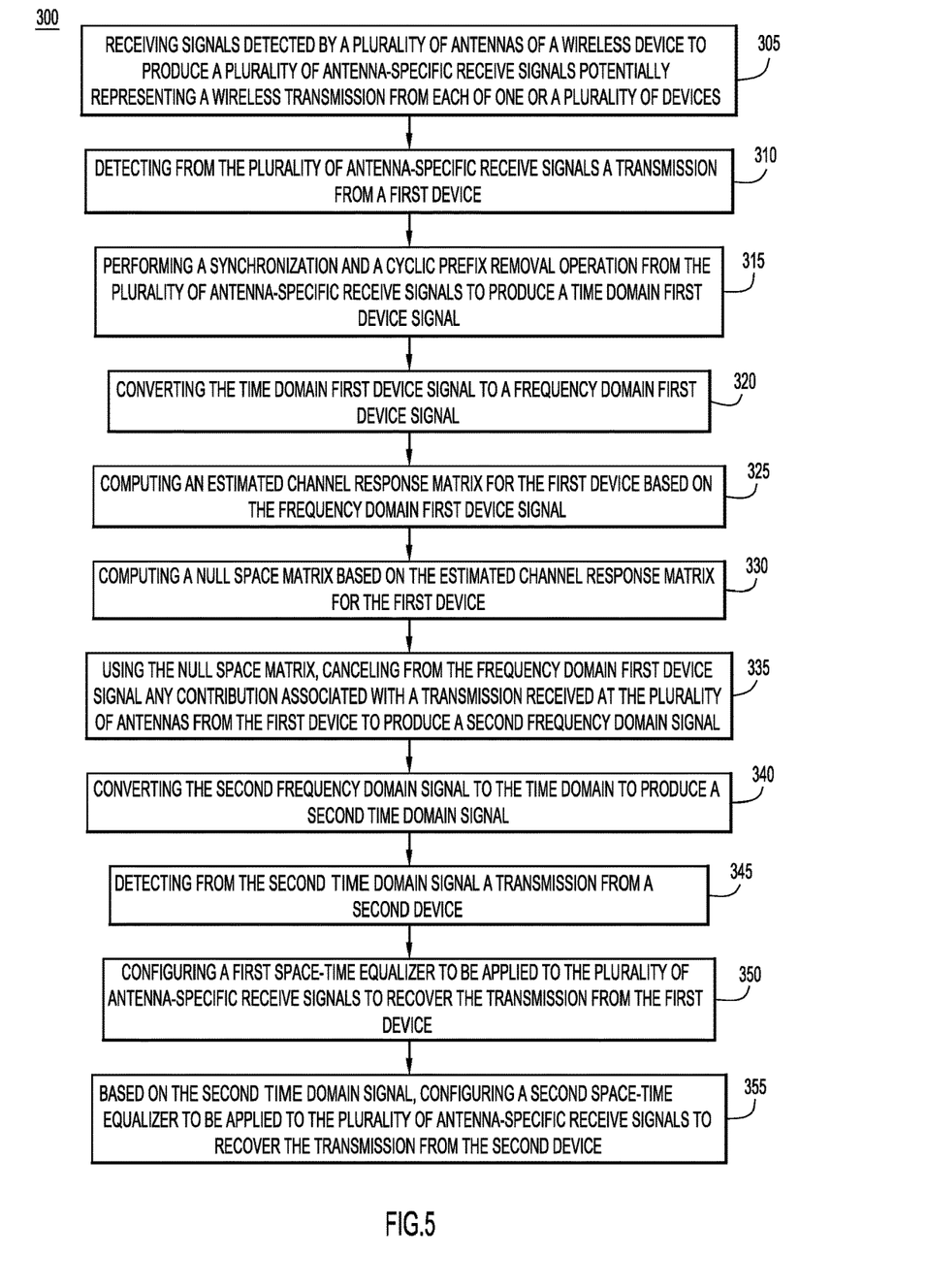
FIG. 5 is a high-level flow chart of the techniques for multi-user MIMO detection using space-time equalization, according to an example embodiment.

Reference is now made to FIG. 5 for a description of a flow chart of a method 300 generalized from the process described above in connection with FIG. 3. In this description, the term "first device" is used in place of the terms first user or User 1, and similarly the term "second device" is used in place of the terms second user or User 2. At 305, signals detected by a plurality of antennas of a wireless device are received to produce a plurality of antenna-specific receive signals potentially representing a wireless transmission from each of one or a plurality of devices. At 310, a transmission from a first device is detected from the plurality of antenna-specific receive signals. At 315, a synchronization and a cyclic prefix removal operation is performed from the plurality of antenna-specific receive signals to produce a time domain first device signal. At 320, the time domain first device signal is converted to a frequency domain first device signal. At 325, an estimated channel response matrix for the first device is computed based on the frequency domain first device signal. At 330, a null space matrix is computed based on the estimated channel response matrix for the first device. At 335, using the null space matrix, any contribution associated with a transmission received at the plurality of antennas from the first device is canceled from the frequency domain first device signal to produce a second frequency domain signal. At 340, the second frequency domain signal is converted to the time domain to produce a second time domain signal. At 345, a transmission from a second device is detected from the second time domain signal.

At 350, a first space-time equalizer is configured/built, to be applied to the plurality of antenna-specific receive signals to recover the transmission from the first device by both equalizing channel effects and canceling out effects associated with transmissions from devices other than the first device in the plurality of antenna-specific receive signals. At 355, based on the second time domain signal, a second space-time equalizer is configured/built, to be applied to the plurality of antenna-specific receive signals to recover the transmission from the second device by both equalizing channel effects and canceling out effects associated with transmissions from devices other than the second device in the plurality of antenna-specific receive signals.

The operation of detecting a transmission from the first device may include computing an auto-correlation on a short training field and a cross-correlation on a long training field, and further comprising computing training coefficients of the first space-time equalizer using first and second long training fields. Detecting a transmission from the second device may include computing a cross-correlation using a long training symbol in the second time domain signal.

The operation of computing the estimated channel response matrix may include computing the channel response across a plurality of subcarriers for a sub-band, and summing channel responses for a plurality of sub-bands, and computing the null space matrix includes computing the null space matrix for each of the plurality of sub-bands.

The method may further include performing a synchronization and a cyclic prefix removal operation for the first device on an output of the first space-time equalizer to produce a recovered time domain first device signal; converting an output of the synchronization and a cyclic prefix removal operation for the first device to the frequency domain to produce a recovered frequency domain first device signal; performing a channel estimation for the recovered frequency domain first device signal to produce a channel estimated first device signal; decoding the channel estimated first device signal to obtain data associated with the transmission from the first device; performing a synchronization and a cyclic prefix removal operation for the second device on an output of the second space-time equalizer to produce a recovered time domain second device signal; converting an output of the synchronization and a cyclic prefix removal operation for the second device to the frequency domain to produce a recovered frequency domain second device signal; performing a channel estimation for the recovered frequency domain second device signal to produce a channel estimated second device signal; and decoding the channel estimated second device signal to obtain data associated with the transmission from the second device.

As described above, configuring the first space-time equalizer and configuring the second space-time equalizer may include computing a coefficient vector g, where g=$(\gamma Y + Y_3^H Y_3)^{-1} Y_3^H x(b_T)$, g is an is an $N_{RX}L_g \times 1$ vector, where g=$[g^T(0), g^T(1), \ldots, g^T(L_g-1)]^T$, each ($N_{RX} \times 1$), g(l)= $[g(l, 1), \ldots, g(l, N_{RX})]^T$, $N_{RX}$ is the number of receive antennas, $L_g$ is the length of equalizer, y is a weighting factor for blind equalization, and Y is an $N_{RX}L_g \times N_{RX}L_g$ mean squared error (MSE) matrix between cyclic prefix (CP) portion and the last $N_{cp}$ samples of each orthogonal frequency division multiplex (OFDM) symbol block, as:

$$Y = \sum_{b=1}^{B} (Y_1(b) - Y_2(b))^H (Y_1(b) - Y_2(b))$$

where B is the number of orthogonal frequency division multiplex (OFDM) symbol blocks used for blind equalization.

Furthermore, $Y_1(b)$ may contain received samples from a cyclic prefix (CP) part of each OFDM symbol from all $N_{RX}$ antennas as:

$$Y_1(b) = \begin{bmatrix} y^T(N_{cp}-1+D, b) & \ldots & y^T(N_{cp}-L_g+D, b) \\ y^T(N_{cp}-2+D, b) & \ldots & y^T(N_{cp}-L_g-1+D, b) \\ \vdots & \ddots & \vdots \\ y^T(D, b) & \ldots & y^T(-L_g+1+D, b) \end{bmatrix},$$

and $Y_2(b)$ contains the received samples from the last $N_{CP}$ samples as $$Y_2(b) = \begin{bmatrix} y^T(N+N_{cp}-1+D, b) & \ldots & y^T(N+N_{cp}-L_g+D, b) \\ y^T(N+N_{cp}-2+D, b) & \ldots & y^T(N+N_{cp}-L_g-1+D, b) \\ \vdots & \ddots & \vdots \\ y^T(N+D, b) & \ldots & y^T(N-L_g+1+D, b) \end{bmatrix},$$

where N is the DFT (FFT) size,
$N_{CP}$ is the CP length,
D is the equalizer delay, and
y(n, b)=$[y_1(n, b), y_2(n, b), \ldots, y_{N_{RX}}(n, b)]^T$ is the nth sample over all antennas of OFDM block b, $0 \leq n \leq N+N_{CP}-1$.

Similarly, $Y_3$ is an $(N+N_{CP}) \times N_{RX}L_g$ received sample matrix for training symbol block as $$Y_3 = \begin{bmatrix} y^T(N+N_{cp}-1+D, b_T) & \ldots & y^T(N+N_{cp}-L_g+D, b_T) \\ y^T(N+N_{cp}-2+D, b_T) & \ldots & y^T(N+N_{cp}-L_g-1+D, b_T) \\ \vdots & \ddots & \vdots \\ y^T(D, b_T) & \ldots & y^T(-L_g+1+D, b_T) \end{bmatrix},$$

where $b_T$ is the training OFDM symbol index, and $x(b_T)$ is an $(N+N_{CPp}) \times 1$ the $b_T$th training OFDM symbol block for each transmit antenna, $x=[x(N+N_{CP}-1, b_T), \ldots, x(0, b_T)]^T$.

The method may further include the first space-time equalizer and the second space-time equalizer producing an output that is a linear convolution of a received signal y and the space-time equalizer g:

$$\tilde{z} = y * g$$
$$z = \tilde{z}(0 : N_{RX} : N_{RX} \times (N+N_{CP}) \times N_{SYM})$$

where y is the $(N_{RX} \times (N+N_{CP}) \times N_{SYM}) \times 1$ received signal vector stacked with received samples over all antennas $y=[y(0,1)^T\ y(1,1)^T \ldots y(N+N_{cp}-1,1) \ldots y(0, N_{SYM})^T\ y(1, N_{SYM})^T \ldots y(N+N_{CP}-N_{SYM})^T]^T$, $N_{SYM}$ is the total number of OFDM symbols received, and z is the output of the first space-time equalizer and the second space-time equalizer.

To summarize, the techniques presented herein permit multiple asynchronous devices/users to maximize spectral efficiency via Multi-User Multiple-Input Multiple-Output (MU-MIMO) methods. The solution uses a semi-blind method to detect and also decode multiple asynchronous users, such as in Wi-Fi wireless networking environments. In particular, this method is useful to allow multiple users to use multi-stream MIMO to simultaneously communicate with an Access Point (AP).

This process accommodates Wi-Fi standards (e.g., IEEE 802.11a/g/n/ac) and does not require any change to the transmitter side to take advantage of MU-MIMO channel efficiency. As a result, devices with legacy hardware can obtain superior wireless throughput with the AP. This method offers low latency, semi-blind detection with relatively low complexity, and high detector performance for all users.

These techniques rely on two identical parts in a frame, e.g., Legacy Long Training Field (L-LTF), to detect the users. The multi-user interference cancellation uses the L-LTF without knowing the channel conditions.

In summary, in one form, a method is provided comprising: receiving signals detected by a plurality of antennas of a wireless device to produce a plurality of antenna-specific receive signals potentially representing a wireless transmission received from each of one or a plurality of devices; detecting from the plurality of antenna-specific receive signals a transmission from a first device; performing a synchronization and a cyclic prefix removal operation from the plurality of antenna-specific receive signals to produce a time domain first device signal; converting the time domain first device signal to a frequency domain first device signal; computing an estimated channel response matrix for the first device based on the frequency domain first device signal; computing a null space matrix based on the estimated channel response matrix for the first device; using the null space matrix, canceling from the frequency domain first device signal any contribution associated with a transmission received at the plurality of antennas from the first device to produce a second frequency domain signal; converting the second frequency domain signal to the time domain to produce a second time domain signal; detecting from the second time domain signal a transmission from a second device; configuring a first space-time equalizer to be applied to the plurality of antenna-specific receive signals to recover the transmission from the first device by both equalizing channel effects and canceling out effects associated with transmissions from devices other than the first device in the plurality of antenna-specific receive signals; and based on the second time domain signal, configuring a second space-time equalizer to be applied to the plurality of antenna-specific receive signals to recover the transmission from the second device by both equalizing channel effects and canceling out effects associated with transmissions from devices other than the second device in the plurality of antenna-specific receive signals.

In another form, an apparatus is provided comprising: a plurality of receive downconverters each coupled to a corresponding one of a plurality of antennas to produce a plurality of antenna-specific receive signals potentially representing a wireless transmission received from each of one or a plurality of devices; a processor coupled to the plurality of receive downconverters, wherein the processor is configured to perform operations including: detecting from the plurality of antenna-specific receive signals a transmission from a first device; performing a synchronization and a cyclic prefix removal operation from the plurality of antenna-specific receive signals to produce a time domain first device signal; converting the time domain first device signal to a frequency domain first device signal; computing an estimated channel response matrix for the first device based on the frequency domain first device signal; computing a null space matrix based on the estimated channel response matrix for the first device; using the null space matrix, canceling from the frequency domain first device signal any contribution associated with a transmission received at the plurality of antennas from the first device to produce a second frequency domain signal; converting the second frequency domain signal to the time domain to produce a second time domain signal; detecting from the second time domain signal a transmission from a second device; configuring a first space-time equalizer to be applied to the plurality of antenna-specific receive signals to recover the transmission from the first device by both equalizing channel effects and canceling out effects associated with transmissions from devices other than the first device in the plurality of antenna-specific receive signals; and based on the second time domain signal, configuring a second space-time equalizer to be applied to the plurality of antenna-specific receive signals to recover the transmission from the second device by both equalizing channel effects and canceling out effects associated with transmissions from devices other than the second device in the plurality of antenna-specific receive signals.

In yet another form, one or more non-transitory computer readable storage media encoded with instructions that, when executed by a processor, cause the processor of a wireless device to perform operations including: obtaining a plurality of antenna-specific receive signals potentially representing a wireless transmission received at a plurality of antennas from each of one or a plurality of devices; detecting from the plurality of antenna-specific receive signals a transmission from a first device; performing a synchronization and a cyclic prefix removal operation from the plurality of antenna-specific receive signals to produce a time domain first device signal; converting the time domain first device signal to a frequency domain first device signal; computing an estimated channel response matrix for the first device based on the frequency domain first device signal; computing a null space matrix based on the estimated channel response matrix for the first device; using the null space matrix, canceling from the frequency domain first device signal any contribution associated with a transmission received at the plurality of antennas from the first device to produce a second frequency domain signal; converting the second frequency domain signal to the time domain to produce a second time domain signal; detecting from the second time domain signal a transmission from a second device; configuring a first space-time equalizer to be applied to the plurality of antenna-specific receive signals to recover the transmission from the first device by both equalizing channel effects and canceling out effects associated with transmissions from devices other than the first device in the plurality of antenna-specific receive signals; and based on the second time domain signal, configuring a second space-time equalizer to be applied to the plurality of antenna-specific receive signals to recover the transmission from the second device by both equalizing channel effects and canceling out effects associated with transmissions from devices other than the second device in the plurality of antenna-specific receive signals.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving signals detected by a plurality of antennas of a wireless device to produce a plurality of antenna-specific receive signals potentially representing a wireless transmission received from each of one or a plurality of devices;
   detecting from the plurality of antenna-specific receive signals a transmission from a first device;
   performing a synchronization and a cyclic prefix removal operation from the plurality of antenna-specific receive signals to produce a time domain first device signal;
   converting the time domain first device signal to a frequency domain first device signal;
   computing an estimated channel response matrix for the first device based on the frequency domain first device signal;
   computing a null space matrix based on the estimated channel response matrix for the first device;
   using the null space matrix, canceling from the frequency domain first device signal any contribution associated with a transmission received at the plurality of antennas from the first device to produce a second frequency domain signal;
   converting the second frequency domain signal to the time domain to produce a second time domain signal;
   detecting from the second time domain signal a transmission from a second device;
   configuring a first space-time equalizer to be applied to the plurality of antenna-specific receive signals to recover the transmission from the first device by both equalizing channel effects and canceling out effects associated with transmissions from devices other than the first device in the plurality of antenna-specific receive signals; and based on the second time domain signal, configuring a second space-time equalizer to be applied to the plurality of antenna-specific receive signals to recover the transmission from the second device by both equalizing channel effects and canceling out effects associated with transmissions from devices other than the second device in the plurality of antenna-specific receive signals.

2. The method of claim 1, wherein detecting a transmission from the first device includes computing an auto-correlation on a short training field and a cross-correlation on a long training field.

3. The method of claim 1, wherein detecting a transmission from the second device includes computing a cross-correlation using a long training symbol in the second time domain signal.

4. The method of claim 1, wherein computing the estimated channel response matrix includes computing the channel response across a plurality of subcarriers for a sub-band, and summing channel responses for a plurality of sub-bands, and computing the null space matrix includes computing the null space matrix for each of the plurality of sub-bands.

5. The method of claim 1, further comprising:
   performing a synchronization and a cyclic prefix removal operation for the first device on an output of the first space-time equalizer to produce a recovered time domain first device signal;
   converting an output of the synchronization and a cyclic prefix removal operation for the first device to the frequency domain to produce a recovered frequency domain first device signal;
   performing a channel estimation for the recovered frequency domain first device signal to produce a channel estimated first device signal;
   decoding the channel estimated first device signal to obtain data associated with the transmission from the first device;
   performing a synchronization and a cyclic prefix removal operation for the second device on an output of the second space-time equalizer to produce a recovered time domain second device signal;
   converting an output of the synchronization and a cyclic prefix removal operation for the second device to the frequency domain to produce a recovered frequency domain second device signal;
   performing a channel estimation for the recovered frequency domain second device signal to produce a channel estimated second device signal; and
   decoding the channel estimated second device signal to obtain data associated with the transmission from the second device.

6. The method of claim 1, wherein configuring the first space-time equalizer and configuring the second space-time equalizer includes computing a coefficient vector g, where $g=(\gamma Y+Y_3^H Y_3)^{-1} Y_3^H x(b_T)$, g is an is an $N_{RX}L_g \times 1$ vector, where $g=[g^T(0), g^T(1), \ldots, g^T(L_g-1)]^T$, each $(N_{RX} \times 1)$, $g(l)=[g(l, 1), \ldots, g(l, N_{RX})]^T$, $N_{Rx}$ is the number of antennas, $L_g$ is the length of equalizer, y is a weighting factor for blind equalization, and Y is an $N_{RX}L_g \times N_{RX}L_g$ mean squared error (MSE) matrix between cyclic prefix (CP) portion and the last $N_{cp}$, samples of each orthogonal frequency division multiplex (OFDM) symbol block, as:

$$Y = \sum_{b=1}^{B} (Y_1(b) - Y_2(b))^H (Y_1(b) - Y_2(b))$$

where B is the number of orthogonal frequency division multiplex (OFDM) symbol blocks used for blind equalization.

7. The method of claim 6, wherein $Y_1(b)$ contains received samples from a cyclic prefix (CP) part of each OFDM symbol from all $N_{RX}$ antennas as:

$$Y_1(b) = \begin{bmatrix} y^T(N_{cp}-1+D,b) & \ldots & y^T(N_{cp}-L_g+D,b) \\ y^T(N_{cp}-2+D,b) & \ldots & y^T(N_{cp}-L_g-1+D,b) \\ \vdots & \ddots & \vdots \\ y^T(D,b) & \ldots & y^T(-L_g+1+D,b) \end{bmatrix},$$

and $Y_2(b)$ contains the received samples from the last $N_{CP}$ samples as $$Y_2(b) = \begin{bmatrix} y^T(N+N_{cp}-1+D,b) & \ldots & y^T(N+N_{cp}-L_g+D,b) \\ y^T(N+N_{cp}-2+D,b) & \ldots & y^T(N+N_{cp}-L_g-1+D,b) \\ \vdots & \ddots & \vdots \\ y^T(N+D,b) & \ldots & y^T(N-L_g+1+D,b) \end{bmatrix},$$

where N is the DFT (FFT) size,
$N_{CP}$ is the CP length,
D is the equalizer delay, and
$y(n, b) = [y_1(n, b), y_2(n, b), \ldots, y_{N_{RX}}(n, b)]^T$ is the nth sample over all antennas of OFDM block b, $0 \le n \le N+N_{CP}-1$.

8. The method of claim 7, wherein $Y_3$ is an $(N+N_{CP}) \times N_{RX}L_g$ received sample matrix for training symbol block as $$Y_3 = \begin{bmatrix} y^T(N+N_{cp}-1+D,b_T) & \ldots & y^T(N+N_{cp}-L_g+D,b_T) \\ y^T(N+N_{cp}-2+D,b_T) & \ldots & y^T(N+N_{cp}-L_g-1+D,b_T) \\ \vdots & \ddots & \vdots \\ y^T(D,b_T) & \ldots & y^T(-L_g+1+D,b_T) \end{bmatrix},$$

where $b_T$ is the training OFDM symbol index, and $x(b_T)$ is an $(N+N_{CPp}) \times 1$ the $b_T$th training OFDM symbol block for each transmit antenna, $x = [x(N+N_{CP}-1, b_T), \ldots, x(0, b_T)]^T$.

9. The method of claim 8, further comprising the first space-time equalizer and the second space-time equalizer producing an output that is a linear convolution of a received signal y and the space-time equalizer g:

$$\tilde{z} = y * g$$
$$z = \tilde{z}(0 : N_{RX} : N_{RX} \times (N+N_{CP}) \times N_{SYM})$$

where y is the $(N_{RX} \times (N+N_{CP}) \times N_{SYM}) \times 1$ received signal vector stacked with received samples over all antennas $y = [y(0,1)^T y(1,1)^T \ldots y(N+N_{cp}-1,1)^T \ldots y(0, N_{SYM})^T y(1, N_{SYM})^T \ldots y(N+N_{CP}-1, N_{SYM})^T]^T$, $N_{SYM}$ is the total number of OFDM symbols received, and z is the output of the first space-time equalizer and the second space-time equalizer.

10. An apparatus comprising:
a plurality of receive downconverters each coupled to a corresponding one of a plurality of antennas to produce a plurality of antenna-specific receive signals potentially representing a wireless transmission received from each of one or a plurality of devices;
a processor coupled to the plurality of receive downconverters, wherein the processor is configured to perform operations including:
detecting from the plurality of antenna-specific receive signals a transmission from a first device;
performing a synchronization and a cyclic prefix removal operation from the plurality of antenna-specific receive signals to produce a time domain first device signal;
converting the time domain first device signal to a frequency domain first device signal;
computing an estimated channel response matrix for the first device based on the frequency domain first device signal;
computing a null space matrix based on the estimated channel response matrix for the first device;
using the null space matrix, canceling from the frequency domain first device signal any contribution associated with a transmission received at the plurality of antennas from the first device to produce a second frequency domain signal;
converting the second frequency domain signal to the time domain to produce a second time domain signal;
detecting from the second time domain signal a transmission from a second device;
configuring a first space-time equalizer to be applied to the plurality of antenna-specific receive signals to recover the transmission from the first device by both equalizing channel effects and canceling out effects associated with transmissions from devices other than the first device in the plurality of antenna-specific receive signals; and
based on the second time domain signal, configuring a second space-time equalizer to be applied to the plurality of antenna-specific receive signals to recover the transmission from the second device by both equalizing channel effects and canceling out effects associated with transmissions from devices other than the second device in the plurality of antenna-specific receive signals.

11. The apparatus of claim 10, wherein the processor is configured to perform detecting of the transmission from the first device by computing an auto-correlation on a short training field and a cross-correlation on a long training field.

12. The apparatus of claim 10, wherein the processor is configured to compute the estimated channel response matrix by computing the channel response across a plurality of subcarriers for a sub-band, and summing channel responses for a plurality of sub-bands, and the processor is configured to compute the null space matrix by computing the null space matrix for each of the plurality of sub-bands.

13. The apparatus of claim 10, wherein the processor is further configured to perform operations including:
performing a synchronization and a cyclic prefix removal operation for the first device on an output of the first space-time equalizer to produce a recovered time domain first device signal;
converting an output of the synchronization and a cyclic prefix removal operation for the first device to the frequency domain to produce a recovered frequency domain first device signal;

performing a channel estimation for the recovered frequency domain first device signal to produce a channel estimated first device signal;

decoding the channel estimated first device signal to obtain data associated with the transmission from the first device;

performing a synchronization and a cyclic prefix removal operation for the second device on an output of the second space-time equalizer to produce a recovered time domain second device signal;

converting an output of the synchronization and a cyclic prefix removal operation for the second device to the frequency domain to produce a recovered frequency domain second device signal;

performing a channel estimation for the recovered frequency domain second device signal to produce a channel estimated second device signal; and decoding the channel estimated second device signal to obtain data associated with the transmission from the second device.

14. The apparatus of claim 10, wherein the processor configures the first space-time equalizer and the second space-time equalizer by computing a coefficient vector g, where $g=(\gamma Y+Y_3{}^H Y_3)^{-1} Y_3{}^H x(b_T)$, g is an is an $N_{RX} L_g \times 1$ vector, where $g=[g^T(0), g^T(1), \ldots, g^T(L_g-1)]^T$, each $(N_{RX} \times 1)$, $g(l)=[g(l, 1), \ldots, g(l, N_{RX})]^T$, $N_{RX}$ is the number of antennas, $L_g$ is the length of equalizer, $\gamma$ is a weighting factor for blind equalization, and Y is an $N_{RX} L_g \times N_{RX} L_g$ mean squared error (MSE) matrix between cyclic prefix (CP) portion and the last $N_{cp}$ samples of each orthogonal frequency division multiplex (OFDM) symbol block, as:

$$Y = \sum_{b=1}^{B} (Y_1(b) - Y_2(b))^H (Y_1(b) - Y_2(b))$$

where B is the number of orthogonal frequency division multiplex (OFDM) symbol blocks used for blind equalization.

15. One or more non-transitory computer readable storage media encoded with instructions that, when executed by a processor, cause the processor of a wireless device to perform operations including:

obtaining a plurality of antenna-specific receive signals potentially representing a wireless transmission received at a plurality of antennas from each of one or a plurality of devices;

detecting from the plurality of antenna-specific receive signals a transmission from a first device;

performing a synchronization and a cyclic prefix removal operation from the plurality of antenna-specific receive signals to produce a time domain first device signal;

converting the time domain first device signal to a frequency domain first device signal;

computing an estimated channel response matrix for the first device based on the frequency domain first device signal;

computing a null space matrix based on the estimated channel response matrix for the first device;

using the null space matrix, canceling from the frequency domain first device signal any contribution associated with a transmission received at the plurality of antennas from the first device to produce a second frequency domain signal;

converting the second frequency domain signal to the time domain to produce a second time domain signal;

detecting from the second time domain signal a transmission from a second device;

configuring a first space-time equalizer to be applied to the plurality of antenna-specific receive signals to recover the transmission from the first device by both equalizing channel effects and canceling out effects associated with transmissions from devices other than the first device in the plurality of antenna-specific receive signals; and based on the second time domain signal, configuring a second space-time equalizer to be applied to the plurality of antenna-specific receive signals to recover the transmission from the second device by both equalizing channel effects and canceling out effects associated with transmissions from devices other than the second device in the plurality of antenna-specific receive signals.

16. The computer readable storage media of claim 15, wherein the instructions for detecting a transmission from the first device include instructions for computing an auto-correlation on a short training field and a cross-correlation on a long training field.

17. The computer readable storage media of claim 15, wherein the instructions for detecting a transmission from the second device includes computing a cross-correlation using a long training symbol in the second time domain signal.

18. The computer readable storage media of claim 15, wherein the instructions for computing the estimated channel response matrix include instructions for computing the channel response across a plurality of subcarriers for a sub-band, and summing channel responses for a plurality of sub-bands, and the instructions for computing the null space matrix include instructions for computing the null space matrix for each of the plurality of sub-bands.

19. The computer readable storage media of claim 15, further comprising instructions for:

performing a synchronization and a cyclic prefix removal operation for the first device on an output of the first space-time equalizer to produce a recovered time domain first device signal;

converting an output of the synchronization and a cyclic prefix removal operation for the first device to the frequency domain to produce a recovered frequency domain first device signal;

performing a channel estimation for the recovered frequency domain first device signal to produce a channel estimated first device signal;

decoding the channel estimated first device signal to obtain data associated with the transmission from the first device;

performing a synchronization and a cyclic prefix removal operation for the second device on an output of the second space-time equalizer to produce a recovered time domain second device signal;

converting an output of the synchronization and a cyclic prefix removal operation for the second device to the frequency domain to produce a recovered frequency domain second device signal;

performing a channel estimation for the recovered frequency domain second device signal to produce a channel estimated second device signal; and decoding the channel estimated second device signal to obtain data associated with the transmission from the second device.

20. The computer readable storage media of claim 15, wherein the instructions for configuring the first space-time equalizer and the instructions for configuring the second space-time equalizer include instructions for computing a coefficient vector g, where $g=(\gamma Y+Y_3^H Y_3)^{-1} Y_3^H \times (b_T)$, g is an is an $N_{RX}L_g \times 1$ vector, where $g=[g^T(0), g^T(1), \ldots, g^T(L_g-1)]^T$, each $(N_{RX} \times 1)$, $g(l)=[g(l, 1), \ldots, g(l, N_{RX})]^T$, $N_{RX}$ is the number of receive antennas, $L_g$ is the length of equalizer, y is a weighting factor for blind equalization, and Y is an $N_{RX}L_g \times N_{RX}L_g$ mean squared error (MSE) matrix between cyclic prefix (CP) portion and the last $N_{cp}$ samples of each orthogonal frequency division multiplex (OFDM) symbol block, as:

$$Y = \sum_{b=1}^{B} (Y_1(b) - Y_2(b))^H (Y_1(b) - Y_2(b))$$

where B is the number of orthogonal frequency division multiplex (OFDM) symbol blocks used for blind equalization.

\* \* \* \* \*